United States Patent [19]

Kamiya

[11] Patent Number: 4,672,534
[45] Date of Patent: Jun. 9, 1987

[54] INTEGRATED CIRCUIT DEVICE INCORPORATING A DATA PROCESSING UNIT AND A ROM STORING APPLICATIONS PROGRAM THEREIN

[75] Inventor: Shigeo Kamiya, Tokyo, Japan

[73] Assignee: Kabushiki Kaisha Toshiba, Kawasaki, Japan

[21] Appl. No.: 611,999

[22] Filed: May 18, 1984

[30] Foreign Application Priority Data

May 23, 1983 [JP] Japan .................. 58-90290

[51] Int. Cl.⁴ .............. G06F 11/22; G06F 13/00; G11C 17/00
[52] U.S. Cl. ................... 364/200; 371/16; 371/25
[58] Field of Search .............. 371/16, 25; 364/200 MS File, 900 MS File

[56] References Cited

U.S. PATENT DOCUMENTS

| | | | |
|---|---|---|---|
| 4,127,768 | 11/1978 | Negi et al. | 371/16 |
| 4,339,801 | 7/1982 | Hosaka et al. | 371/16 |
| 4,347,608 | 8/1982 | Appiano et al. | 371/16 |
| 4,459,666 | 7/1984 | Kruger | 364/200 |
| 4,538,269 | 8/1985 | Briscoe | 371/15 |

FOREIGN PATENT DOCUMENTS 56-33741  4/1981  Japan .................. 371/16

*Primary Examiner*—Archie E. Williams
*Assistant Examiner*—Lawrence E. Anderson
*Attorney, Agent, or Firm*—Oblon, Fisher, Spivak, McClelland & Maier

[57] ABSTRACT

An integrated circuit device includes a data processing unit (CPU), a first read only memory (ROM) storing an applications program to be executed in the CPU, a second ROM having an address space which is addressed in common with the first ROM and storing a test program for a function diagnosis, and a test control unit. The test control unit is responsive to a test control signal externally applied in a test mode to couple the second ROM to the CPU so that the test program for setting an initial condition is executed. During the execution of the test program, the first ROM is coupled to the CPU, thereby executing applications program instructions the contents and the number of which are externally designated. Thereafter, the second ROM is coupled to the CPU so as to execute the test program for deciding a test complete condition. The execution result of the applications program instructions are compared with expected values to decide if the integrated circuit device functions normally. The address space of first and second ROMs is expanded in a software manner, and the address space of the first ROM can be assigned only to the applications program.

1 Claim, 2 Drawing Figures

INTEGRATED CIRCUIT DEVICE INCORPORATING A DATA PROCESSING UNIT AND A ROM STORING APPLICATIONS PROGRAM THEREIN

BACKGROUND OF THE INVENTION

The present invention relates to an integrated circuit device which incorporates a read only memory (ROM) storing an applications program.

With recent developments in IC techniques, an integrated circuit device incorporating a data processing unit (CPU) and a ROM which stores an applications program has been developed. In such a device, instructions can be internally applied from the ROM to the CPU which constitutes a main part of the device. Therefore, the number of input/output terminals can be reduced to provide compact and inexpensive devices. In such an integrated circuit device, function diagnosis of the CPU and the ROM can be performed by executing instruction of one or more steps stored in the ROM and by thereafter comparing the results with expected values. In this case, a test program for an initial condition setting and a test complete condition decision is provided from the ROM. In such a test system, the test program is arranged in the address space of the ROM. Therefore, the applications program must be prepared in consideration of the test program. In other words, in the address space occupied by the test program the applications program or data cannot be arranged. Accordingly, the address space for the applications program is reduced. For example, when 4-K words of a 64-K word address space are assigned to the test program, the applications program must be arranged within the remaining 60-K word address space.

SUMMARY OF THE INVENTION

It is an object of the present invention to provide an integrated circuit device incorporating a data processing unit (CPU) and a read only memory (ROM) which stores an applications program, wherein the address space of the ROM can be assigned to only the applications program irrespective of a test program for testing the functions of the CPU and the ROM.

The integrated circuit device of the present invention is characterized by comprising, in addition to a first ROM for storing an applications program for the CPU, a second ROM having an address space which is addressed in common with the first ROM and stores a test program, and a test control unit for expanding the address space of the first and second ROMS in a software manner. In the testing mode, the test control unit is responsive to an externally applied test control signal to couple the second ROM to the CPU so that the test program is executed. By executing the test program, the first ROM is coupled to the CPU so that a part of the applications program stored in the first ROM and externally designated is executed. When the execution of the applications program is completed, the second ROM is coupled to the CPU again so as to excute the test program for comparing execution results of the applications program with expected values.

According to the present invention, the address space of the first ROM can be assigned to only the applications program, because the second ROM for the test program is provided in addition to the first ROM.

DETAILED DESCRIPTION OF THE PREFERRED EMBODIMENT

Figure 1:
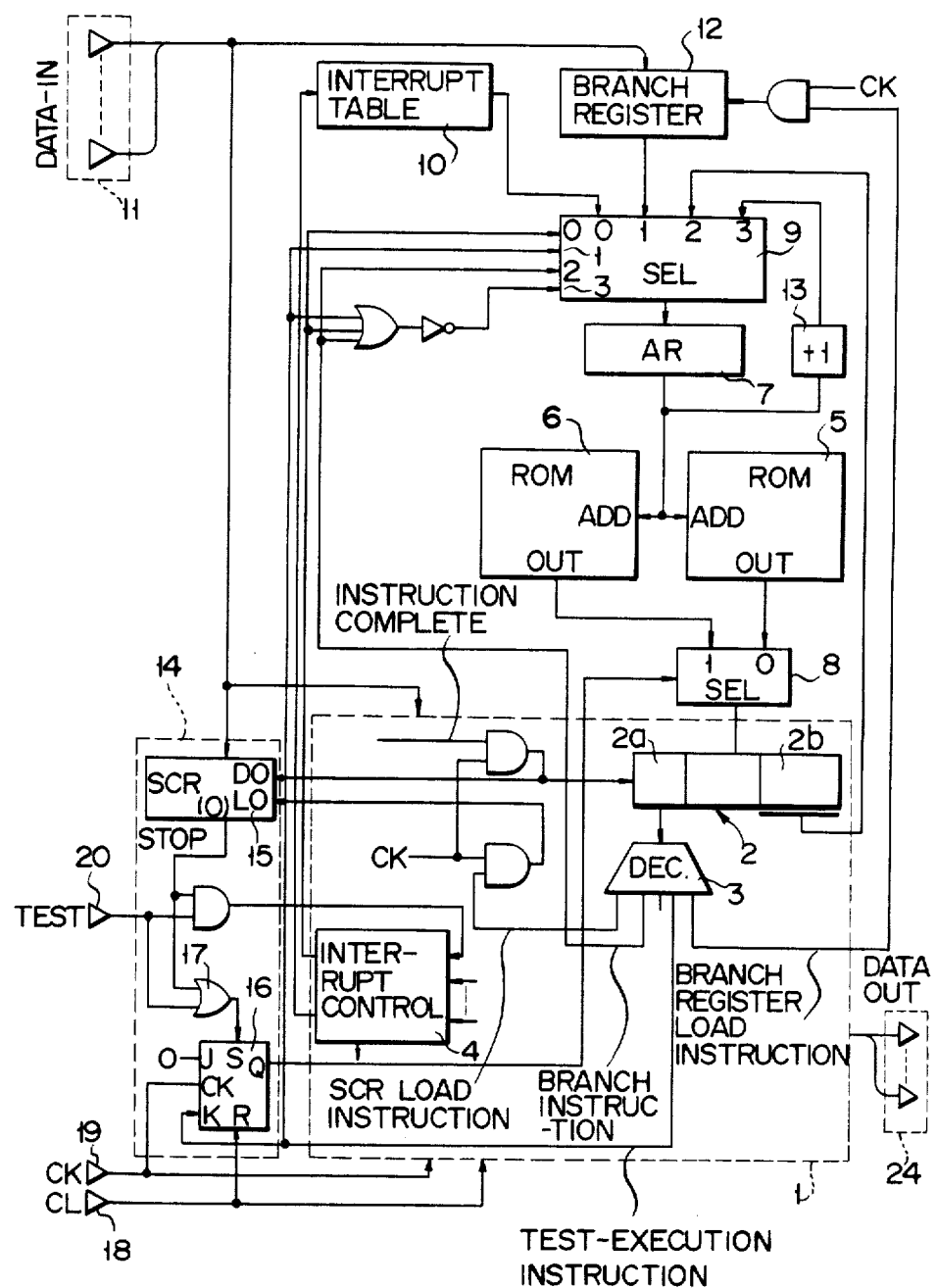
FIG. 1 shows a block diagram of an integrated circuit device according to the present invention.

Referring to FIG. 1, a central processing unit (CPU) 1 comprises an instruction register 2 in addition to the conventional circuit components such as an accumulator, a general register, an ALU and a RAM (not shown). The instruction register 2 stores an instruction which is currently being processed. The register 2 is constructed by an instruction code field 2a and a field 2b which indicates a branch address for a branch instruction, and the like. An instruction code set in field 2a is decoded by a decoder 3. An interrupt control circuit 4 is provided to control various interruptions.

Figure 2:
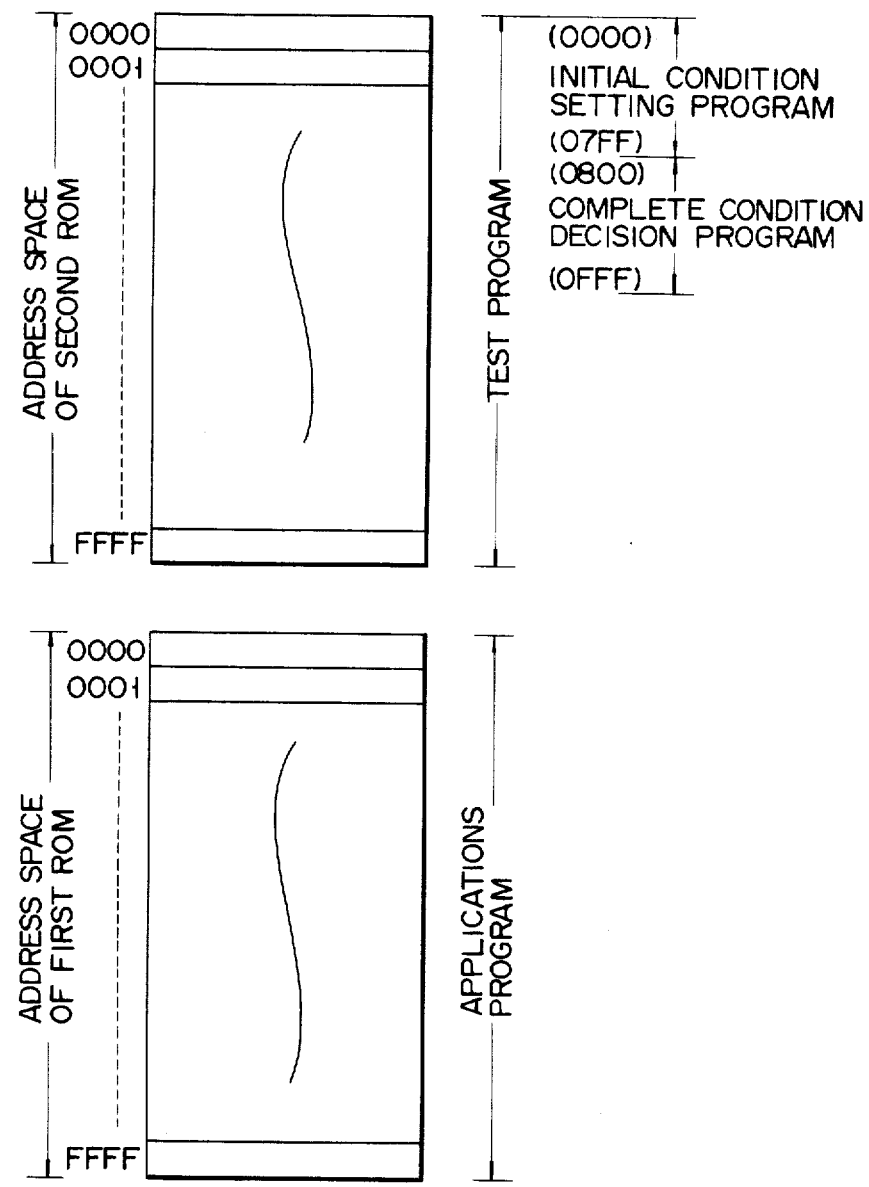
FIG. 2 shows the address space of the first and second ROMS.

The applications program for CPU 1 is stored in a first ROM 5. The first ROM 5 has 64-K word address space. Similarly, a second ROM 6 also has a 64-K word address space and stores a test program. The ROMS 5 and 6 have the same address as shown in FIG. 2 and are addressed in common by a address register 7. Therefore the two program instructions are read out independently. One of the program instructions read out from ROMS 5 and 6 is selected by a selector 8 to be loaded into instruction register 2 of CPU 1. The test program comprises an initial condition setting program for setting an initial condition necessary for the execution of the test and a program for deciding results of the test.

The address register 7 is loaded with address data selected by a selector 9 to address ROMS 5 and 6. The selector 9 selects one of address data stored in an interrupt table 10, address data externally applied through data input terminals 11 and loaded in a branch register 12, address data incremented by an increment circuit 13, and branch destination address data loaded in field 2b of instruction register 2. As a result, address data are successively loaded in address register 7 in accordance with the excution of the instructions.

A test control unit 14 is provided for performing various controls for the test when a function diagnosis mode is set. The test control unit 14 comprises a stop counter (SCR) 15 in which data applied to data input terminals 11 and indicating the number of instructions to be executed is preset, and a flip-flop 16 for expanding the address space of ROMS 5 and 6 in a software manner. The count of SCR is decremented every time a single instruction is completed. When all the preset number of instructions are completed, the SCR 15 generates an output signal STOP. The flip-flop 16 is set by a test control signal TEST which is applied to a terminal 20 or the output signal STOP of SCR 15. A set output signal of flip-flop 16 controls selector 8. In the test mode, the output signal STOP of SCR 15 controls as a test complete signal interrupt control circuit 4 through an AND gate.

The operation in the test mode will now be described. When a power supply is turned on, the integrated circuit device, especially registers 2 and 7 and flip-flop 16 are reset by a clear signal CL applied to a clear terminal 18. Thereafter, the operation timing of the circuit device is governed by a clock signal CK applied to a terminal 19. The test control signal TEST is applied to terminal 20 for testing the circuit device, thereby setting flip-flop 16 through an OR gate 17. As a result, the selector 8 selects ROM 6 to load address data read out therefrom into instruction register 2. At this time, the address data is a start address (0000) of the initial condition setting program, as shown in FIG. 2. In this manner, the initial condition setting program is executed, and initial data necessary for testing are loaded into the accumulator, the general register and the like of CPU 1. Thereafter, address data which indicates the start address of the applications program to be executed for testing, which is externally applied to data input terminals 11, is loaded into branch register 12 by a branch register load instruction decoded by decoder 3 in accordance with the test program. Similarly, data which indicates the number of instructions to be executed is loaded into SCR 15 from terminal 11 by a SCR load instruction decoded by decoder 3.

When the initial condition setting program is completed in this manner, a test execution instruction is loaded in field 2a of instruction register 2. This test execution instruction resets flip-flop 16 through decoder 3 and controls selector 9 to cause the start address of the program instruction to be executed, which has been loaded in branch register 12, to be transferred to address register 7. When flip-flop 16 is reset, the selector 8 selects ROM 5 storing the applications program. As a result, a program instruction read out from a location of ROM 5 which is designated by address register 7 is loaded into instruction register 2 of CPU 1 through selector 8 so that the instruction is executed. Every time an instruction is executed, an instruction complete signal is issued, to decrement SCR 15, and increment the address data of address register 7 through increment circuit 13 and selector 9. Thus, the program instruction of the next address is executed.

In this manner, part of the applications program instructions are successively executed. When the number of the executed instructions reaches the preset number of SCR 15, the SCR 15 issues an output signal STOP so as to control interrupt control circuit 4 and to set flip-flop 16 again. As a result, the selector 8 selects ROM 6. The interrupt control circuit 4 issues an interrupt request signal and an interrupt table address signal. The selector 9 selects interrupt table 10 in response to the interrupt request signal. The interrupt table address signal is applied to interrupt table 10, so that address data, for example, (0800) is read out therefrom to designate the start address of the complete condition decision program of the test program and is transferred to address register 7 through selector 9. Thus, the complete condition decision program is read out from ROM 6, to be executed by CPU 1. By this program the decision is made whether or not the processing results obtained in the accumulator and the general register of CPU 1 coincide with the expected values. This decision can be made internally. Alternatively, the decision may be made externally after the processing results have been output through data output terminals 21. When a coincidence between the processing results and the expected values cannot be obtained, the circuit device will be determined to be defective.

When a coincidence between the processing results and the expected values can be obtained, the next test is prepared. More specifically, data indicating the start address of part of the application program to be next executed and data indicating the number of the instructions to be executed are applied to data input terminals 11, and the test control signal TEST is applied to terminal 20. Then, another test is executed in the same manner as described above. In this manner, the above-mentioned processings are repeatedly executed, and when no error is found in all the test results, the circuit device can be determined to be normal.

The present invention is not limited to the above embodiment. For example, the address space of ROM 6 may be determined in accordance with the number of steps needed for the test program. Also, the execution procedure of the test is not particularly limited.

What is claimed is:

1. A one-chip integrated circuit device comprising:
   a data processing unit for performing data processing in response to application program instructions applied thereto, said data processing unit comprising an instruction register and an instruction decoder coupled to said instruction register for decoding and instruction set therein, and generating an instruction-execution signal each time an instruction set in said instruction register has been executed;
   a first read only memory operatively coupled to said data processing unit for storing application program instructions and applying, when coupled to said data processing unit, the application programs to said data processing unit so that said data processing unit performs data processing according to the application program instructions;
   a second read only memory operatively coupled to said data processing unit for storing test programs adapted for testing functions of said data processing unit and said first and second read only memories, said second read only memory having an address space addressable in common with said first read only memory and applying, when coupled to said data processing unit, the test programs to said data processing unit so that said data processing unit performs the test programs, and the test programs including a first test program having a first instruction for setting test data to said data processing unit and a second instruction to couple said first read only memory to said data processing unit to process the test data according to the application program instructions stored in said first read only memory, and a second test program for deciding a result of the data processing on the test data performed by said data processing unit;
   an address register coupled to said first and second read only memories for addressing said first and second read only memories in common in accordance with address data set therein;
   a first selector coupled to said first and second read only memories for selectively coupling one of said first and second read only memories to said instruction register in said data processing unit;
   an increment circuit connected to receive the address data from said address register for incrementing the address data;
   a branch register connected to receive externally applied address data which specify a start address of part of the application program instructions to be executed by said data processing unit during a test mode;
   an interrupt table for storing a start address of the second teat program stored in said second read only memory;
   a second selector responsive to said data processing unit for selectively coupling one of said increment circuit, said branch register and said interrupt table to said address register; and test control means responsive to an externally applied test control signal and including a counter and a flip-flop, said counter being externally preset with the number of application program instructions to be executed by said data processing unit during the test mode and decremented by the instruction-execution complete signal to generate an output signal when all the application program instructions, the number of which has been preset in said counter, are executed, and said flip-flop being set by one of the test control signal and the output signal of said counter to cause said first selector to couple said second read only memory to said instruction register in said data processing unit to perform the first test program so that test data is set in said data processing unit, the start address and the number of the application program instructions are loaded in said branch register and said counter, respectively, and reset by an output of said instruction decoder when the second instruction is loaded in said instruction register at the end of the first test program to cause said first selector to couple said first read only memory to said instruction register so that the application program instructions are executed by said data processing unit from the start address set in said branch register;

said second selector being controlled by said data processing unit to couple to said address register said increment circuit when the first test program is executed, said branch register when the second instruction is loaded in said instruction register, or said interrupt table when the execution of the application program instructions is completed so that said counter produces the output signal to initiate the execution of the second test program.

* * * * *